US008051743B2

(12) United States Patent
Kullberg et al.

(10) Patent No.: US 8,051,743 B2
(45) Date of Patent: Nov. 8, 2011

(54) THROTTLE CONTROL DEVICE FOR A HAND HELD TOOL

(75) Inventors: Stefan Kullberg, Jönköping (SE); Roger Rogersten, Linköping (SE); Pär Martinsson, Jönköping (SE); Oskar Bergquist, Jönköping (SE)

(73) Assignee: Husqvarna AB, Huskvarna (SE)

( * ) Notice: Subject to any disclaimer, the term of this patent is extended or adjusted under 35 U.S.C. 154(b) by 954 days.

(21) Appl. No.: 10/571,514

(22) PCT Filed: Aug. 19, 2004

(86) PCT No.: PCT/SE2004/001217

§ 371 (c)(1),
(2), (4) Date: Feb. 21, 2007

(87) PCT Pub. No.: WO2005/025822

PCT Pub. Date: Mar. 24, 2005

(65) Prior Publication Data

US 2007/0275822 A1 Nov. 29, 2007

(30) Foreign Application Priority Data

Sep. 12, 2003 (SE) ....................................... 0302439

(51) Int. Cl.
*F16C 1/10* (2006.01)
*F02D 11/02* (2006.01)
*B27B 17/00* (2006.01)
*B23D 59/00* (2006.01)

(52) U.S. Cl. .................... 74/502.2; 74/501.6; 74/483 R; 123/398; 30/382

(58) Field of Classification Search .................... 74/526, 74/527, 501.6, 489, 502.4, 502.2; 30/381; 123/398; 56/11.3; *B27B 17/00*
See application file for complete search history.

(56) References Cited

U.S. PATENT DOCUMENTS

| | | | | |
|---|---|---|---|---|
| 4,028,804 | A | 6/1977 | Hammond | |
| 4,428,180 | A * | 1/1984 | Carlson | 56/11.3 |
| 4,833,935 | A * | 5/1989 | Roelle | 74/483 R |
| 5,142,934 | A * | 9/1992 | Persson et al. | 74/502.4 |
| 5,842,277 | A * | 12/1998 | Haberlein et al. | 30/276 |
| 5,862,713 | A * | 1/1999 | Tsunoda et al. | 74/526 |
| 6,000,683 | A * | 12/1999 | Van Allen | 261/52 |
| 6,055,797 | A * | 5/2000 | Nagashima | 56/11.3 |
| 6,182,524 | B1 | 2/2001 | Nagashima | |
| 6,196,082 | B1 * | 3/2001 | Iwata | 74/501.6 |
| 6,209,412 | B1 * | 4/2001 | Hiratsuna et al. | 74/502.2 |
| 6,347,787 | B1 * | 2/2002 | Tobinai et al. | 261/23.3 |
| 6,581,568 | B2 * | 6/2003 | Kramer | 123/398 |
| 7,000,593 | B2 * | 2/2006 | Muller et al. | 123/398 |

FOREIGN PATENT DOCUMENTS

WO WO 2004/037494 A1 * 5/2004

* cited by examiner

*Primary Examiner* — Vinh T. Luong
(74) *Attorney, Agent, or Firm* — Pearne & Gordon LLP

(57) ABSTRACT

A throttle control device for a hand held tool, such as a chain saw, is provided. The tool is provided with a forwardly extending wire for transmitting a motion from a throttle control lever turnably arranged about a first axis to a throttle valve. One end of the wire is secured to a wire arm that is turnably arranged about a second axis. The wire arm is provided with one or several teeth cooperating with the throttle control lever and the second axis is arranged behind the first axis.

7 Claims, 2 Drawing Sheets

THROTTLE CONTROL DEVICE FOR A HAND HELD TOOL

CROSS-REFERENCE TO RELATED APPLICATIONS

This application claims the benefit of International Application Number PCT/SE2004/001217, which was published in English on Mar. 24, 2005.

FIELD OF THE INVENTION

This invention relates to a throttle control device for a hand held tool, such as a chain saw, which is provided with a forwardly extending wire for transmitting a motion from a throttle control lever turnably arranged about a first axis to a throttle valve, one end of the wire being secured to a wire arm that is turnably arranged about a second axis and that is provided with one or several teeth cooperating with corresponding means on the throttle control lever.

BACKGROUND OF THE INVENTION

In conventional combustion engines that are provided with carburetors the carburetor comprises one or several throttle valves with associated return springs that are connected to a throttle control lever via a bowden cable. The spring or springs are designed such that they safely can pull the throttle valve back also under bad conditions such as when the motion is influenced by dirt and freezing temperatures. For this reason the springs have to be rather strong which means the force transmitted to the control lever increases considerably. Since a finger acting on the throttle control lever is very sensitive for these type of forces such forces causes discomfort and might lead to injuries for the operator.

It is also previously known, see U.S. Pat. No. 6,182,524, to use a toothed transmission gear linked to a separate cable/pulley arrangement in order to transmit the forces from the throttle control lever to the throttle valve. This arrangement is however rather complicated and space demanding.

SUMMARY OF THE INVENTION

The purpose of this invention is to create an arrangement that does not have the drawbacks mentioned above and that makes it possible to increase the length of the wire motion as well as to reduce the forces needed to depress the throttle control lever. This is achieved by means of a device having the characteristics mentioned in the claims.

BRIEF DESCRIPTION OF THE DRAWINGS

An embodiment of the invention will now be described with reference to the accompanying drawing on which FIG. 1 is a vertical section of a part of a chain saw whereas

Figure 1:
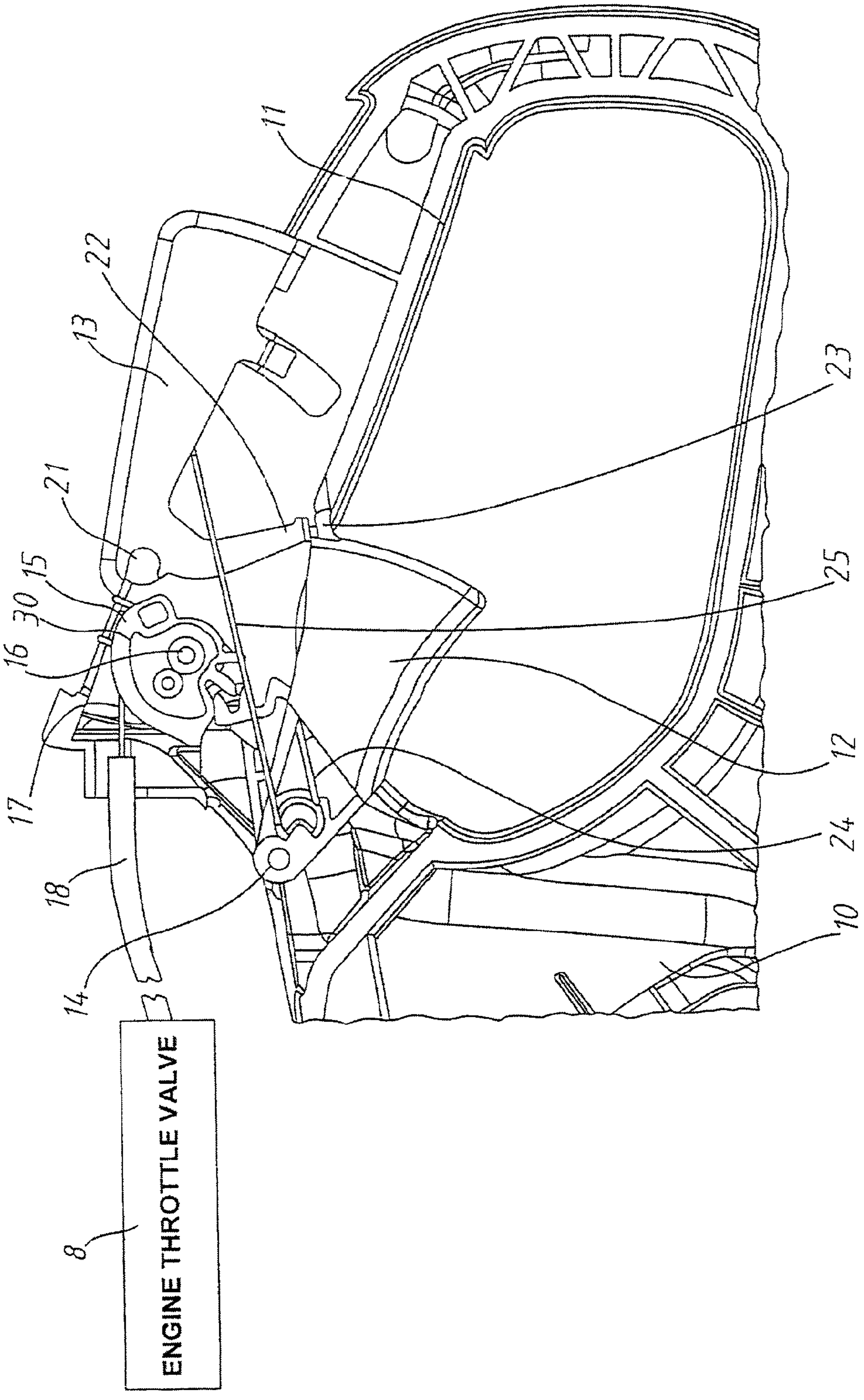
Figure 2:
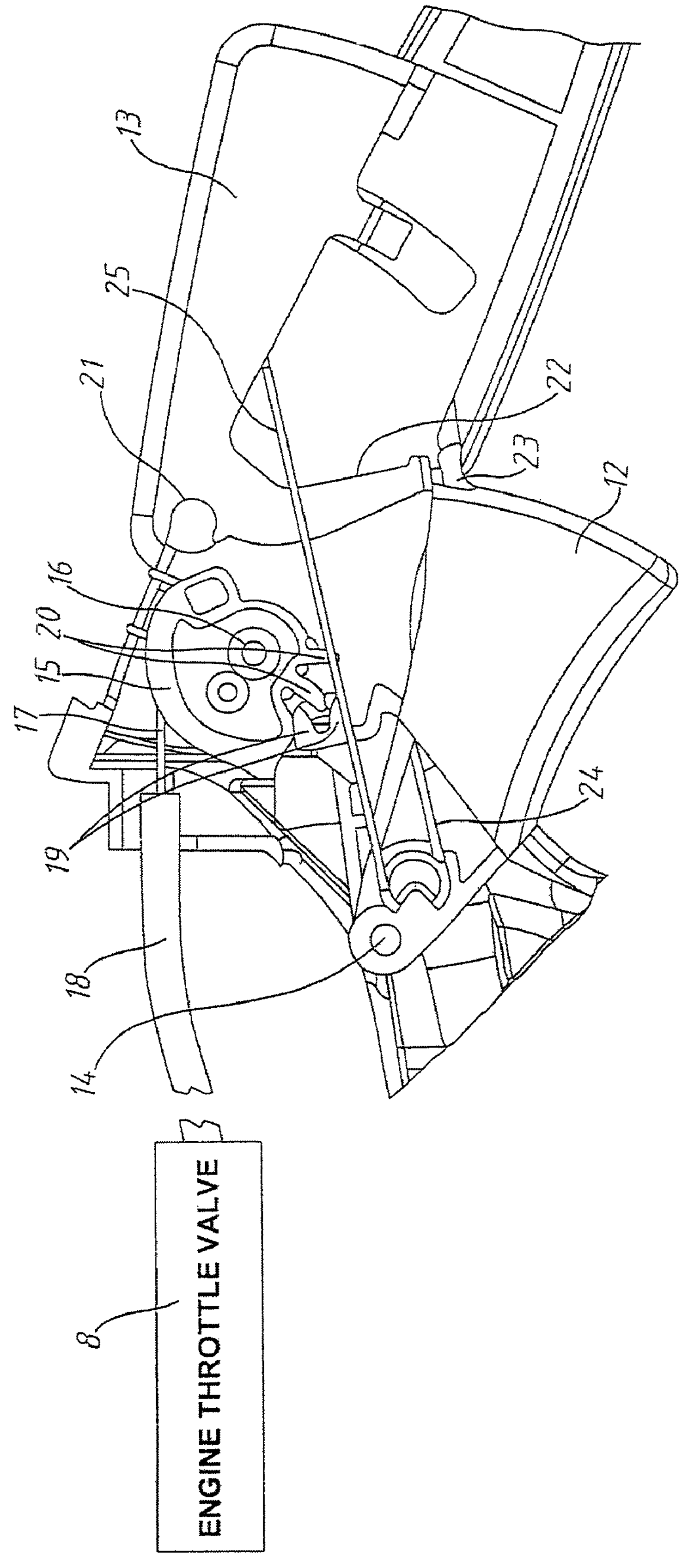
FIG. 2 is the same view but with the interesting parts in an enlarged scale.

A chain saw with a combustion engine has a chassis 10 enclosing a combustion engine, a fuel tank and a gear for driving a saw chain which is arranged on a guide bar extending in the forward direction from the front part of the chassis. The engine is provided with a carburetor having a throttle arrangement being provided with a spring loaded throttle valve. The rear end of the chassis has a handle 11 that is provided with a throttle control lever 12 and a safety lever 13. The throttle control lever 12 is pivotally arranged with respect to the chassis 10 and is turned about a first axis 14. The throttle control lever 12 co-operates with a wire arm 15 that is shaped as a pulley and is turnably arranged about a second axis 16 arranged behind the first axis 14.

The wire arm 15 is provided with a curved support surface 30 (as seen in the second axis 16 direction) for a wire 17 extending in a forward direction from the wire arm. The curved surface extends at least 15° about the second axis 16 and is U- or V-shaped in section. Alternatively the support surface 30 is provided with mainly radially extending, spaced side wall portions at each side of the support surface 30.

One end of the wire 17, that is an inner part of a bowden cable 18, is secured to the wire arm 15 whereas the other end of the wire is secured to said throttle valve arrangement 8 in the combustion engine carburetor. The throttle valve arrangement is under the influence of one or several springs that creates a pulling force on the wire arm 15 whereas the cover of the bowden cable 18 is secured to the chassis 10.

The throttle control lever 12 as well as the wire arm 15 are provided with co-operating teeth 19 and 20 designed such that when the throttle control lever is turned about the first axis 14 a corresponding turning motion is created for the wire arm 15 about the second axis 16 thereby pulling the wire to the right in the figures.

The safety lever 13 is turnably arranged about a third axis 21 and has a portion 22 that comes into engagement with a projection 23 on the throttle control lever when the throttle control lever is acted on without first depressing the safety lever 13. The safety lever 13 as well as the throttle control lever 12 are under the influence of springs 24 and 25. The springs 24, 25 constitute the two end parts of a coiled thread spring that is secured to the chassis 10.

The device operates in the following manner. When starting the engine the safety lever 13 is depressed which means that the portion 22 comes out of engagement of the projection 23 such that the throttle control lever 12 can be activated. When the throttle control lever is pivoted about the first axis 14 the teeth 19 will act on the teeth 20 of the wire arm 15 which means that the wire arm starts to pivot about the second axis 16 thereby pulling the wire 17 against the spring forces of the throttle arrangement in the carburetor. When the throttle control lever 12 and the safety lever 13 are released the springs 24, 25 will push these two levers back to their original position which means that the throttle control lever can not be activated before the safety lever is again depressed. During the return motion of the throttle control lever the teeth 19,20 will also, by means of the spring 24, co-operate to turn the wire arm 15 back to its original position.

The invention claimed is:

1. A throttle control device for controlling a variable engine throttle valve of a hand held tool grasped and supported by an operator, the device comprising; a forwardly extending wire (17) for transmitting a variable range of motion from a manually-actuated throttle control lever (12) turnably arranged about a first axis (14) to the variable throttle valve, one, rearward end of the wire being secured to a wire arm (15) that is turnably arranged about a second axis (16) and that is provided with one or several teeth (20) cooperating with corresponding teeth (19) on the throttle control lever (12) characterized in that the second axis (16) is arranged behind the first axis (15) with respect to the forward direction of the extending wire (17) and the second axis (16) is further from the variable throttle valve than the first axis (15), wherein the wire is coaxially rotatable with the wire arm about the second axis, the throttle control lever (12) cooperates with a safety lever (13) that prevents the throttle control lever from moving if the safety lever is not activated, the throttle control lever (12) is under the influence of a first return spring (24), the safety lever (13) is under the influence of a second return spring (25), and the first return spring (24) and second return spring (25) are parts of a one-piece formed spring.

2. The throttle control device according to claim 1 characterized in that the wire arm (15) comprises a curved support surface for the wire as seen in the second axis (16) direction.

3. The throttle control device according to claim 2 characterized in that the support surface extends at least around said second axis (16).

4. The throttle control device according to claim 2 characterized in that the support surface at least partly is circular.

5. The throttle control device according to claim 1 characterized in that the wire (17) is a part of a Bowden cable (18).

6. The throttle control device according to claim 1, wherein the hand held tool comprises a chain saw.

7. The throttle control device according to claim 1 characterized in that the second return spring is one-piece formed.

* * * * *